No. 687,393. Patented Nov. 26, 1901.
M. P. BOSS.
SELF FASTENING SHAFT KEY.
(Application filed May 14, 1901.)
(No Model.)

Witnesses. Inventor.
Martin P. Boss.
by Wm. F. Booth
his Attorney.

UNITED STATES PATENT OFFICE.

MARTIN PRIOR BOSS, OF SAN FRANCISCO, CALIFORNIA.

SELF-FASTENING SHAFT-KEY.

SPECIFICATION forming part of Letters Patent No. 687,393, dated November 26, 1901.

Application filed May 14, 1901. Serial No. 60,208. (No model.)

*To all whom it may concern:*

Be it known that I, MARTIN PRIOR BOSS, a citizen of the United States, residing in the city and county of San Francisco, State of California, have invented certain new and useful Improvements in Self-Fastening Shaft-Keys; and I do hereby declare the following to be a full, clear, and exact description of the same.

My invention relates to the class of keys for fastening cams, pulleys, couplings, and other devices having hubs to shafting.

The object of the invention is to provide what may be termed a "self-fastening" key, in that the tendency of the hub to turn relatively to the shaft causes the tightening of the key.

My invention consists in the novel construction, combination, and arrangement of the shaft provided with a key-seat, the hub having a bore for the shaft and a counterbore, and the concavo-convex key conforming to said key-seat and counterbore, all as I shall hereinafter fully describe and claim.

The accompanying drawings illustrate my invention.

Figure 1:
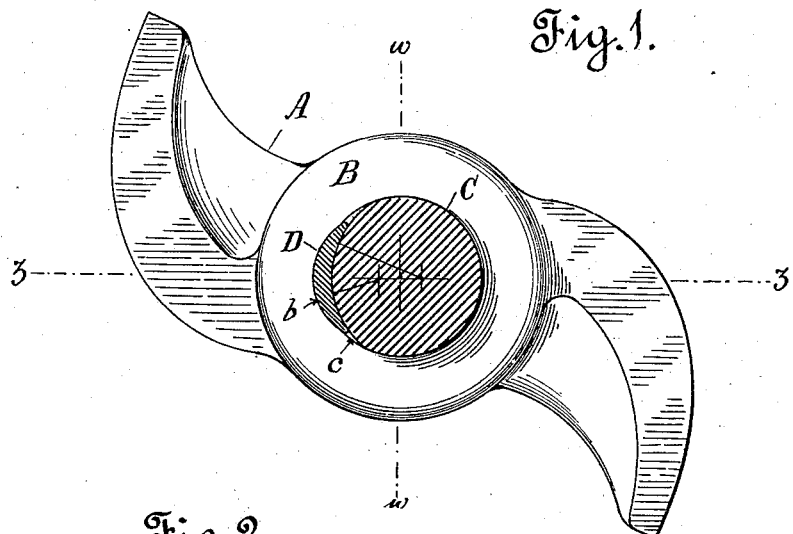
Figure 2:
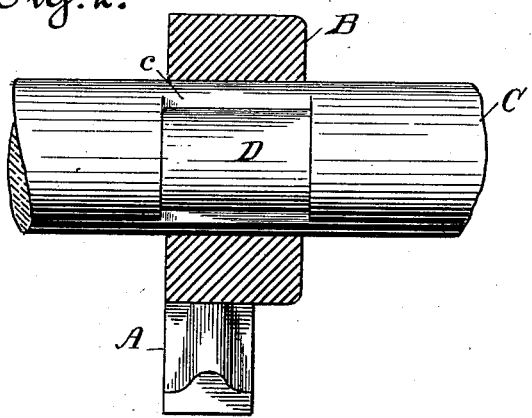
Figure 3:
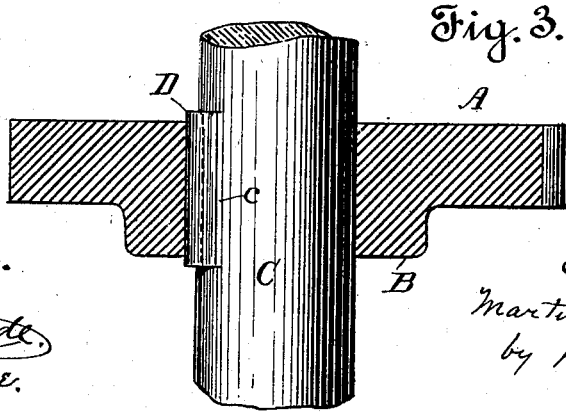

Figure 1 is an elevation of a cam with the shaft in cross-section and showing the counterbore in the cam-hub, the key-seat or counter-turn in the shaft, and the key in position. Fig. 2 is a section at $w\ w$ of Fig. 1, showing the shaft and key in elevation. Fig. 3 is a section at $z\ z$ of Fig. 1, showing the shaft and key in elevation.

In showing a cam as the device to be attached to the shaft I am to be understood as merely illustrating thereby any device to be attached to shafting, whether such devices are cams, pulleys, couplings, or any other devices with hubs usually keyed to a shaft.

In the drawings, A is the cam, having a hub B. In this hub is made a counterbore $b$.

C is the shaft. In the shaft is made a counter-turn $c$, which forms part of the key-seat. This key-seat or counter-turn is struck from an interior center, as shown. There is thus left between the counterbore in the hub and the counter-turn in the shaft a cancavo-convex segmental space. In this space is seated the concavo-convex segmental key D. Now on account of this segmental space diminishing in area as the hub is revolved upon the shaft away from the center of the turn or cut in the shaft the key is pushed by the counterbore in the hub as the latter is revolved until it is tightly gripped by said counterbore, and said key is thus a self-fastening one.

It is best in practice to make the counterbore in the hub of a radius less than the radius of the shaft.

Having thus described my invention, what I claim as new, and desire to secure by Letters Patent, is—

1. The combination with a shaft provided with a counter-turn forming a key-seat, and a hub having a bore for the shaft and a counterbore, of a concavo-convex key conforming to said key-seat and counterbore, substantially as described.

2. The combination with a shaft provided with a counter-turn forming a key-seat, and a hub having a bore for the shaft and a simple counterbore extending from end to end thereof, of a concavo-convex key conforming to said key-seat in the shaft and to said counterbore, substantially as described.

In witness whereof I have hereunto set my hand.

MARTIN PRIOR BOSS.

Witnesses:
C. F. PATTON,
C. L. GILBERT.